United States Patent
Beck et al.

(10) Patent No.: US 6,480,007 B1
(45) Date of Patent: Nov. 12, 2002

(54) CAPACITIVE SENSOR EXCITATION TECHNIQUES

(75) Inventors: Martin E. Beck, Manhattan Beach, CA (US); Ashley Powers Danial, Redondo Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/543,601

(22) Filed: Apr. 5, 2000

(51) Int. Cl.[7] ............................................. G01R 27/26
(52) U.S. Cl. ........................................ 324/662; 324/668
(58) Field of Search ................................ 324/662, 668, 324/676, 677, 682, 661

(56) References Cited

U.S. PATENT DOCUMENTS

| | | | |
|---|---|---|---|
| 3,902,374 A | * 9/1975 | Hoffman et al. | 310/90.5 |
| 4,054,833 A | 10/1977 | Briefer | |
| 4,347,478 A | * 8/1982 | Heerens et al. | 324/611 |
| 4,879,552 A | * 11/1989 | Arai et al. | 324/660 |
| 5,065,105 A | 11/1991 | Bruere et al. | |
| 5,196,775 A | * 3/1993 | Harris et al. | 318/607 |
| 5,691,646 A | * 11/1997 | Sasaki | 324/662 |

* cited by examiner

Primary Examiner—N. Le
Assistant Examiner—Vincent Q. Nguyen
(74) Attorney, Agent, or Firm—McAndrews, Held & Malloy, Ltd.

(57) ABSTRACT

A position sensor determines relative changes in position of a first member and a second member. A first conductor is movable with one of the members and a second conductor is energized in response to a first electrical signal coupled to the first conductor across a gap. The coupling induces a current in the first conductor having a current value which varies in response to relative changes in the position of the first and second members. A power supply furnishes a predetermined supply voltage and a pulse generator generates output pulses at a predetermined repetition rate. A resonant circuit has a center resonant frequency within a range of resonant frequencies that include the repetition rate of the pulse generator. The resonant circuit generates the first signal with a voltage greater than the supply voltage so that the induced current value is sufficiently large to facilitate further processing.

24 Claims, 6 Drawing Sheets

CAPACITIVE SENSOR EXCITATION TECHNIQUES

BACKGROUND OF THE INVENTION

The present invention relates to position sensing devices, and more particularly relates to techniques for exciting such devices.

In order to produce output signals that accurately represent position, it is necessary to maximize the detected output signal. Because the excitation signal typically crosses an air gap between sensor plates, it is desirable to use a relatively high frequency, large magnitude excitation signal. However, if the high powered excitation signal must travel a long distance to the capacitive sensor, the excitation signal can be degraded or can interfere with the operation of other components.

Although the excitation signal ideally would be generated as close to the capacitive sensor as possible in order to minimize these types of problems, previously available devices used remotely generated excitation signals. These devices did not have the capacity to generate excitation signals which were high in frequency, large in amplitude and close to the capacitive position sensor. Although it was possible to use transformers to proximately generate these types of signals, transformers are very heavy components that consume large amounts of power.

A need has long existed in the industry for a capacitive position sensor excitation technique which provides a high frequency, high amplitude excitation signal with reduced cost, weight, size and power consumption.

BRIEF SUMMARY OF THE INVENTION

The present invention is useful in a position sensor for determining relative changes in position of a first member movable with respect to a second member. According to a preferred apparatus aspect of the invention, the sensor includes at least a first conductor movable with one of the first and second members, as well as a second conductor displaced from the first conductor by a gap. The second conductor is energized in response to an electrical first signal so that at least a portion of the first signal is coupled to the first conductor across the gap. The coupling induces a current in the first conductor having a current value which varies in response to relative changes in position of the first and second members. A power supply furnishes a predetermined supply voltage to the sensor. A pulse generator generates output pulses at a predetermined repetition rate, and transmits the pulses to a resonant circuit having a center frequency within a range of resonant frequencies that includes the repetition rate of the pulse generator. The resonant circuit is responsive to the output pulses in order to generate the first signal with a voltage greater than the supply voltage so that the current value is sufficiently large to facilitate further processing.

According to a preferred method aspect of the invention, a predetermined supply voltage is furnished to the sensor and output pulses are generated at a predetermined repetition rate. The first signal is generated with a signal voltage greater than the supply voltage so that the current value is sufficiently large to facilitate processing.

By using the foregoing techniques, an excitation signal with adequate amplitude and frequency can be generated while reducing weight, cost and power consumption. The invention enables an excitation signal to be produced adjacent the conductor which is energized on one side of the gap, thereby avoiding long coaxial cables which otherwise would need to be used. In addition, the use of the resonant circuit avoids the need for heavy, large and expensive transformers which have been required in the past.

DETAILED DESCRIPTION OF THE PREFERRED EMBODIMENT

Referring to the drawings, a preferred form of a position sensor 10 basically comprises a housing 20, a rotor 50, a stator 60 and a circuit board 64. The basic purpose of sensor 10 is to generate a signal indicating the relative motion between a first member, such as stator 60 and a second member, such as rotor 50.

Figure 1:
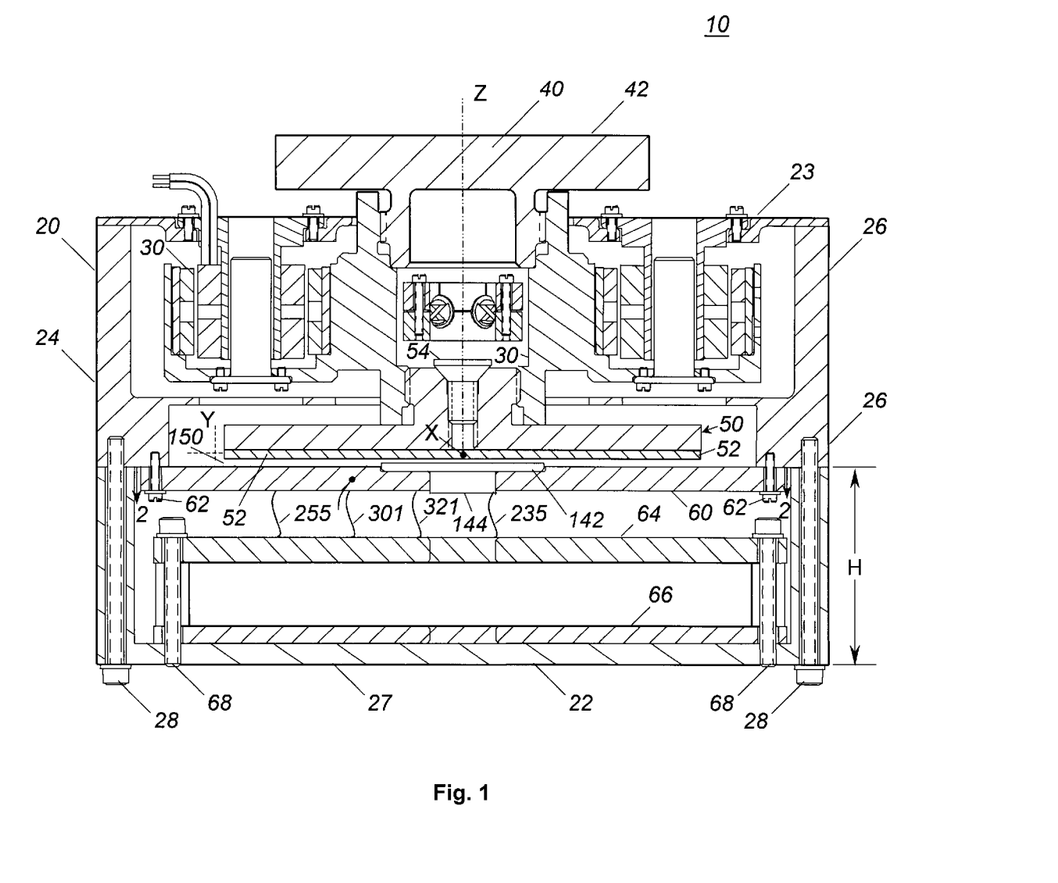
FIG. 1 is a cross-sectional view of a preferred form of the mechanical portions of a position sensor made in accordance with the present invention.

Housing 20 includes a rear wall 22, a front wall 23, and sidewalls 24 and 25. The housing is divided into an upper section 26 which is bolted to a lower section 27 by bolts 28.

Housing 20 may support a two axis gimbal mechanism 30 which is disclosed in more detail in U.S. application Ser. No. 09/481,921 now U.S. Pat. No. 6,327,065, filed Jan. 13, 2000, in the names of Ashley P. Danial and Arthur P. Balz, and entitled "Fine Pointing Assembly Configuration," which is incorporated by reference. Gimbal mechanism 30 causes a mirror 40 having a reflective surface 42 to rotate with two degrees of freedom around an x and y axes.

Rotor 50 defines a planar metallic circular charge disc 52 which is held to the gimbal mechanism by a conventional screw 54 so that mirror 40 and rotor 50 rotate together around the x and y axes.

Stator 60 is fastened to and held within housing 20 by bolts 62. Circuit boards 64 and 66 are mounted within housing 20 by bolts 68. As a result, circuit boards 64 and 66 are in a fixed position relative to stator 60 and housing 20.

Referring to FIG. 1, height H is 0.75 inch and housing 20 is no more than 3 inches on the side, and preferably is 2 inches or less on a side.

Figure 2:
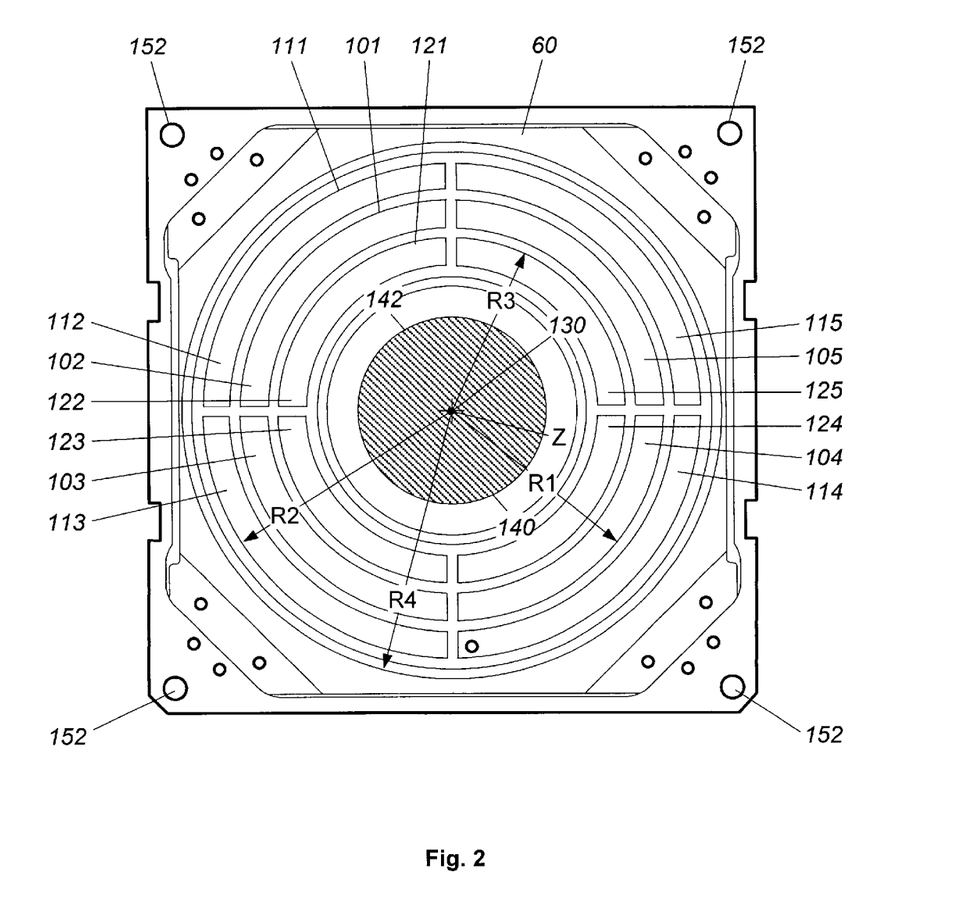
FIG. 2 is a top plan view of a preferred form of the stator shown in FIG. 1 taken along line 2—2.

Referring to FIG. 2, stator 60 supports a primary conductor arrangement 101, a redundant conductor arrangement 111 and a feedback conductor arrangement 121 as shown.

Primary conductor arrangement 101 comprises conductive primary sensing sectors 102–105 in which sectors 102 and 104 are arranged on opposite sides of an axis, such as radius R2, and sectors 103 and 105 also are arranged on opposite sides of an axis, such as radius R1. Sectors 102–105 are arranged on a circle defining an outer parameter with radius R1.

Redundant conductor arrangement 111 comprises conductive redundant sensing sectors 112–115 arranged on a circle defining an outer parameter with radius R2. Redundant arrangement 111 is only used in the event of a failure in primary arrangement 101 or associated electronics.

Primary sectors 102 and 104 are processed together as a pair, and sectors 103 and 105 are independently processed together as a pair. The redundant sectors 112–115 are arranged and connected similar to primary sensing sectors 102–105 in that sectors 112 and 114 are processed together as a pair and sectors 113 and 115 are independently processed together as a pair.

Feedback conductor arrangement 121 comprises conductive feedback sectors 122–125 which are all processed together. Sectors 122–125 are arranged on a circle defining an outer parameter R3.

Each of the circles on which the sectors are arranged have a common center point 130.

Stator 60 also includes a conductive charge plug 140 comprising a disc 142 and a shaft 144. Conductor arrangements 101, 111, and 121 are separated from charge disc 52 by an air gap 150. Mirror 40 and rotor 50 form one member that is movable with respect to a second member formed by housing 20 and stator 60.

Charge disk 52 defines an orthogonal set of axes x, y, and z in which each of the axes passes through the center point of disk 52, and the z axis also passes through center point 130 of stator 60 (FIG. 2). Disk 52 has a radius R4 as shown in FIG. 2. Gimbal mechanism 30 rotates charge disk 52 (and mirror 40) around both the x and the y axes within about plus or minus 0.5 degrees of arc.

Figure 3:
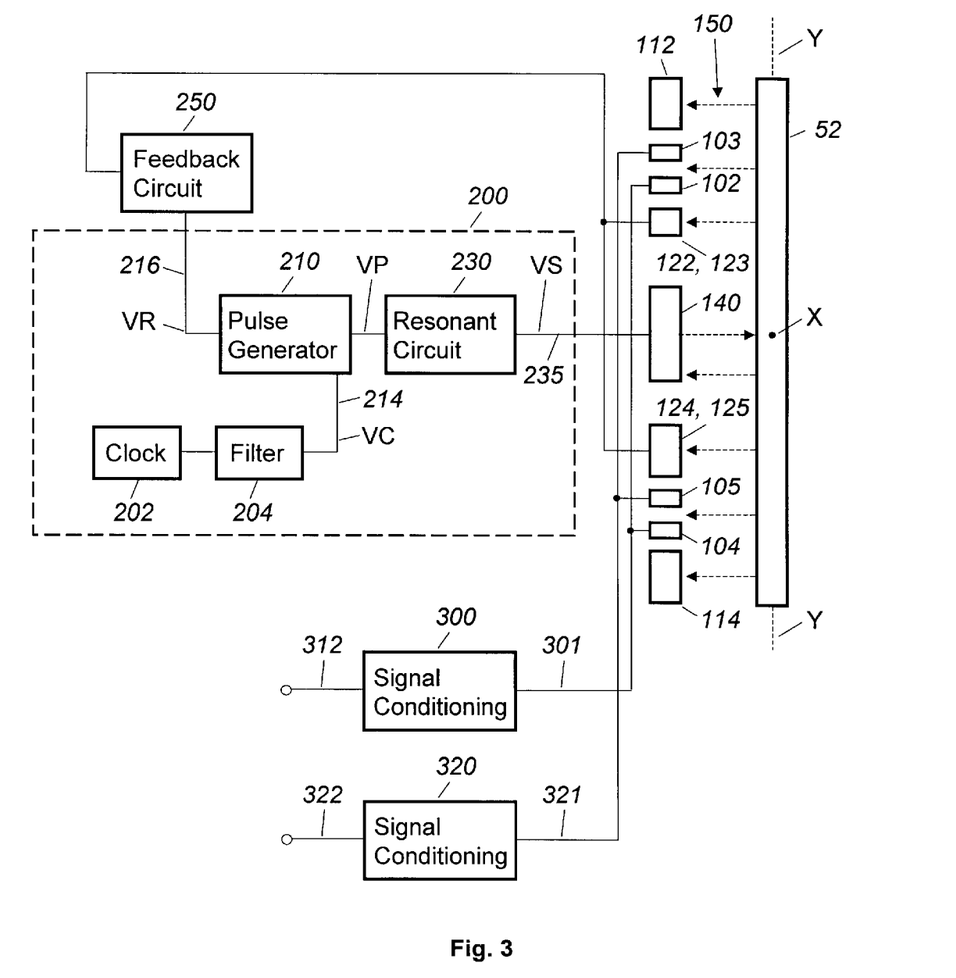
FIG. 3 is a fragmentary schematic block diagram of a preferred form of the present invention, including electronic portions.
Figure 4:
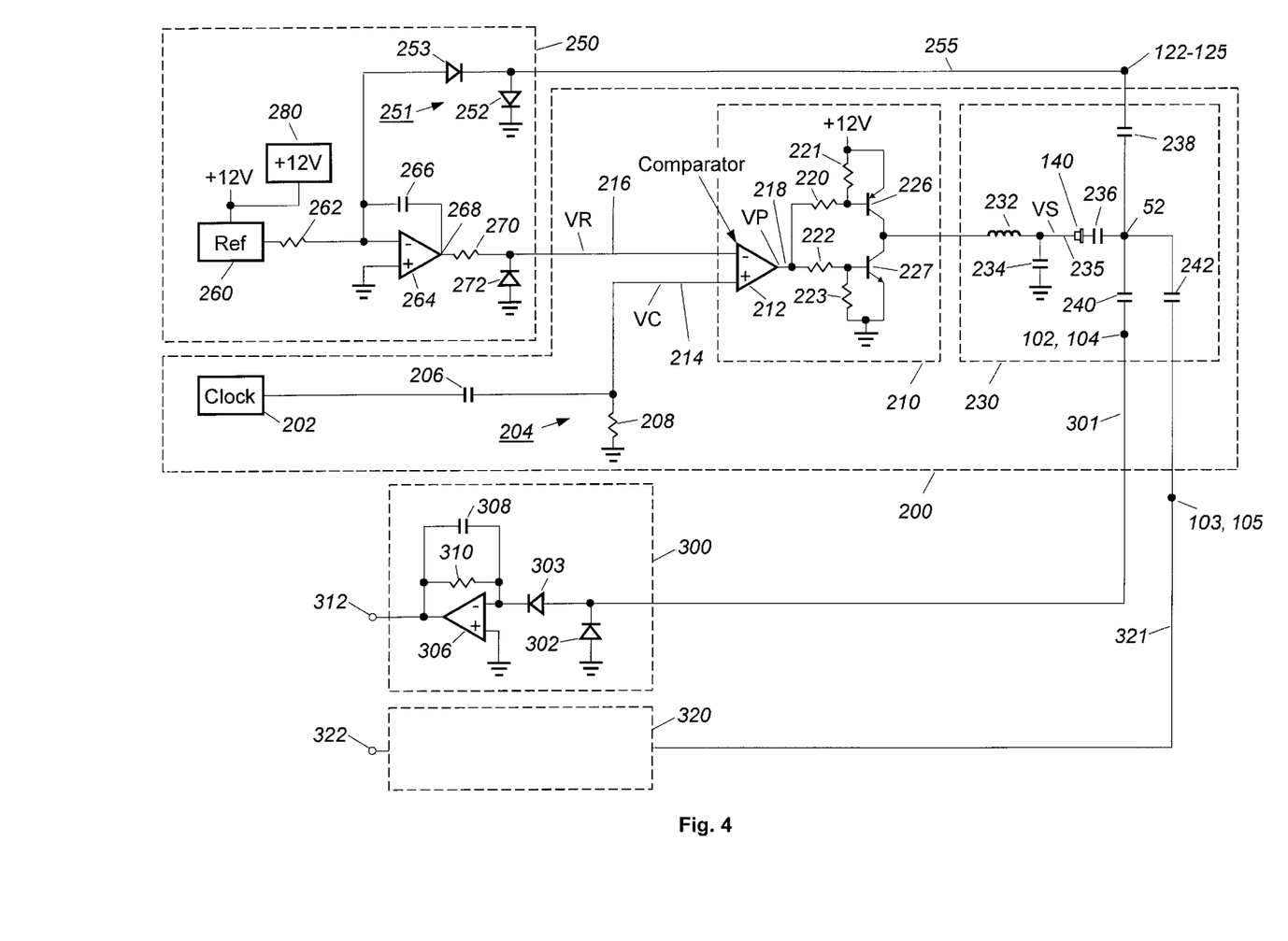
FIG. 4 is an electrical schematic diagram of certain details of the circuitry illustrated in FIG. 3.

Referring to FIGS. 3 and 4, circuit board 64 comprises a signal generator 200, and a feedback circuit 250, signal conditioning circuits 300 and 320.

Figure 5A:
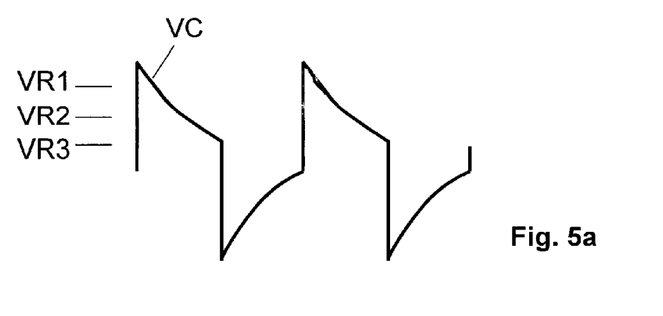
FIG. 5 illustrates wave forms of various signals generated by the circuitry shown in FIG. 4.

Signal generator 200 comprises a conventional clock pulse generating circuit 202 having a repetition rate of about 1 megahertz. The clock pulses are filtered by a filter 204, comprising a capacitor 206 and a resistor 208, which forms a partially ramp-shaped signal VC (FIG. 5a).

Signal generator 200 also includes a pulse generator 210 comprising an operational amplifier (op amp) 212 arranged as a comparator. Op amp 212 compares the signals present on input conductors 214 and 216 in order to generate output pulses VP (FIGS. 5b–d) on an output 218. The duty cycle of pulses VP varies according to the value of the signal on conductor 216 in a manner described subsequently.

Pulse generator 210 also includes resistors 220–223 and transistors 226–227 connected to a 12 volt D.C. supply as shown. Transistors 226–227 are used to supply pulses to resonant circuit 230 with sufficient drive current.

Resonant circuit 230 has a center resonant frequency of 1 megahertz which is identical to the repetition rate of clock 202. Resonant circuit 230 also includes an inductor 232 and a capacitor 234 connected as shown. Resonant circuit 230 generates a sinusoidal signal VS (FIG. 5e) having an amplitude A with a nominal value of about 60 volts peak to peak generated from a 12 volt DC supply. Resonant circuit 230 also includes the inherent capacitance 236 of gap 150 from plug 140 to charge disk 52, the inherent capacitance 238 of gap 150 from charge disk 52 to sectors 122–125, the inherent capacitance 240 of gap 150 from charge disk 52 to sectors 102 and 104, and the inherent capacitance 242 from charge disk 52 to sectors 103 and 105.

Referring to FIG. 4, feedback circuit 250 comprises a converter circuit 251 including rectifying diodes 252–253 connected as shown. The diodes are connected to each of sectors 122–125 through a circuit trace conductor 255 which extends from the front side of stator 60 to the rear side of stator 60 (FIG. 1).

Feedback circuit 250 also includes a resistor 262 and a reference voltage generator 260 (FIG. 4) which generates a reference DC current. A transimpedence amplifier 264 has a feedback capacitor 266 which filters the rectified current from converter circuit 251. Amplifier 264 includes an output 268 connected to a resistor 270 and a grounded diode 272.

A conventional 12 volt DC power supply 280 is connected to provide 12 volts DC at the points indicated in FIG. 4.

Still referring to FIG. 4, signal conditioning circuit 300 comprises a conductor 301 connected to sectors 102 and 104. Conductor 301 supplies the current induced in sectors 102 and 104 to diodes 302 and 303. A feedback capacitor 308 and a resistor 310 are connected to a transimpedance amplifier 306. Amplifier 306 delivers a DC output voltage on a conductor 312 proportional to the angle between stator 60 and rotor 50 due to rotation around the x axis. Capacitor 308 filters the rectified signal from diodes 302–303.

Another signal conditioning circuit 320 identical to circuit 300 produces an output voltage on a conductor 322 proportional to the angle between stator 60 and rotor 50 due to rotation around the y axis. Circuit 320 is connected through conductor 321 to sectors 103 and 105.

Figure 6:
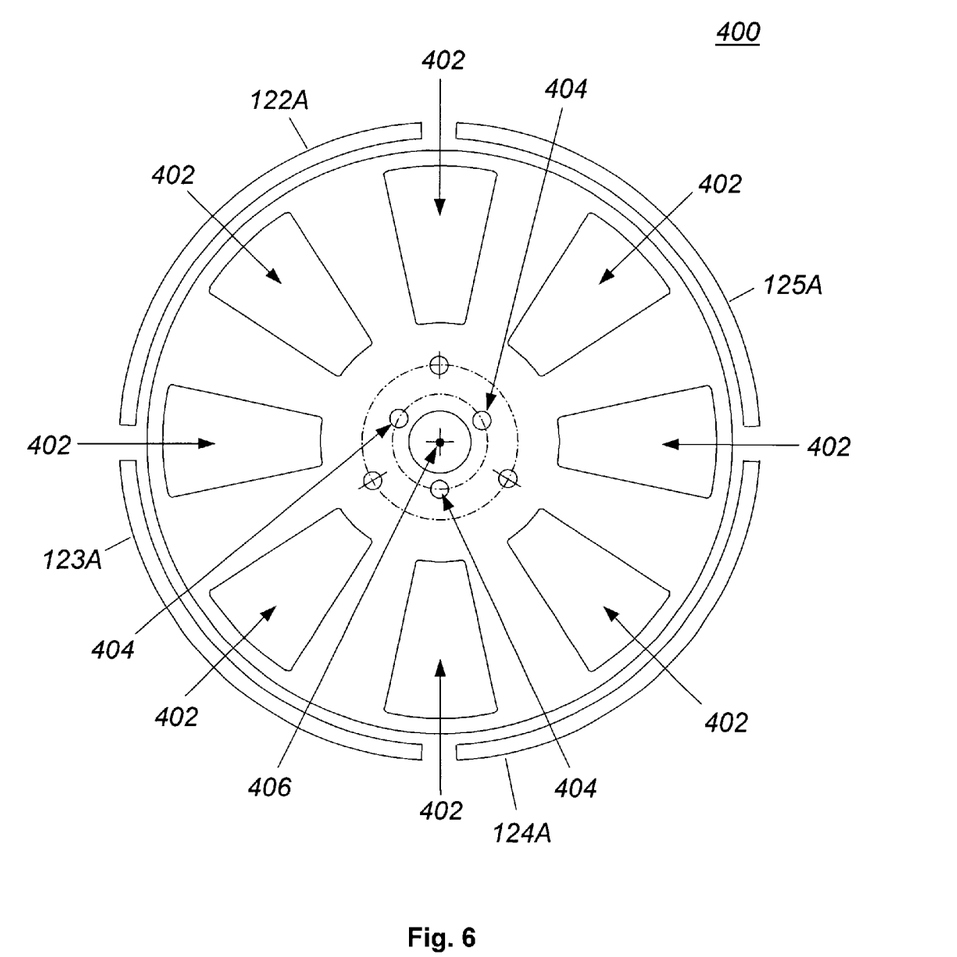
FIG. 6 is an alternative embodiment of the feedback conductor arrangement shown in FIG. 2.

FIG. 6 illustrates an alternative embodiment of feedback sectors 122–125 based on the structure of the capacitive resolver described in U.S. application Ser. No. 09/310,365 filed May 12, 1999 in the names of Johnson, Sherman and Franson, and entitled "Capacitive Resolver," which is incorporated by reference. FIG. 4 of the Johnson et al. application describes an interrupter plate 400 as shown in FIG. 6 of this application. In the environment of interrupter plate 400, sectors 122–125 shown in FIG. 2 would be arranged as sectors 122A–125A, respectively, outside the perimeter of interrupter plate 400 so that the sectors are continuously exposed to current induced from a charge disk, such as disk 52, to which an energizing signal is applied.

The embodiment shown in FIGS. 1–5 of the present application operates as follows.

Sensor 10 may be used to determine the relative position of stator 60 and rotor 50 (as well as mirror 40) in a satellite laser beam communication acquisition and tracking system in which mirror 40 is used to direct a laser beam to other optical components (FIG. 1). Mirror 40 is controlled by gimbal mechanism 30 to rotate with 2 degrees of freedom around orthogonal x and y axes within a range of about plus or minus 0.5 degrees of arc. As a result, rotor 50 is caused to tip and tilt with respect to stator 60, thereby changing the width of gap 150 and changing the capacitance between charge disk 52 and conductor arrangements 101, 111, and 121 (FIG. 2).

Resonant circuit 230 (FIGS. 3 and 4) generates sinusoidal signal VS (FIG. 5e) having a nominal amplitude of about 60 volts and transmits signal VS to charge plug 140. The signal is coupled across gap 150 to charge disk 52 and again is coupled across gap 150 from charge disk 52 to conductor arrangements 101, 111, and 121 (FIGS. 1 and 3). Currents are induced in each of conductor arrangements 101, 111, and 121 due to the coupling of signal VS from charge plug 140 to charge disk 52 and from charge disk 52 to the conductor arrangements.

Charge disk 52 tips and tilts with respect to charge plug 140 around the x and y axes. Since feedback sectors 122–125 are connected together, the total capacitance remains constant and there is no change in the resulting current induced in the feedback sectors due to the change in position of disk 52 with respect to charge plug 140. However, changes in environmental conditions result in a change in the capacitance and current induced in sectors 122–125. As a result, the current induced in sectors 122–125 changes with variable environmental conditions but does not change due to changes in the tip/tilt position between charge disk 52 and charge plug 140.

The current induced in conductor arrangements 101 and 111 change in response to changes in the tip/tilt position between charge disk 52 and charge plug 140, as well as with respect to changes in environmental conditions. Sectors 102 and 104 are responsive to rotation around the x axis, and sectors 103 and 105 are responsive to rotation around the y axis.

The current induced in feedback sectors 122–125 is rectified by diodes 252 and 253 (FIG. 4) and is summed with the constant reference voltage produced by circuit 260 at the negative input to amplifier 264. The rectified current from diodes 252 and 253 is filtered by capacitor 266 so that the output 268 generates a DC signal which varies in DC level depending on the changes in environmental conditions. The DC level is transmitted as signal VR (FIG. 5a) to input 216 of pulse generator 210. Pulse generator 210 also receives a ramp signal VC (FIG. 5a) from clock 202 and filter 204.

Figure 5B:
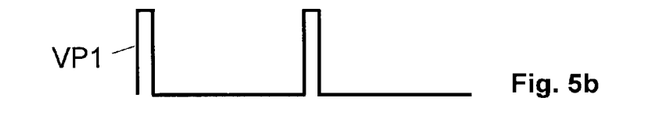
Figure 5C:
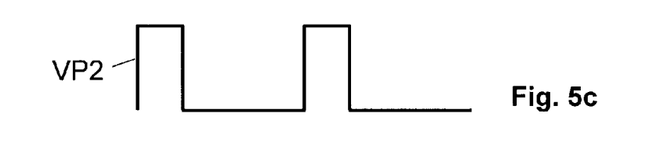
Figure 5D:
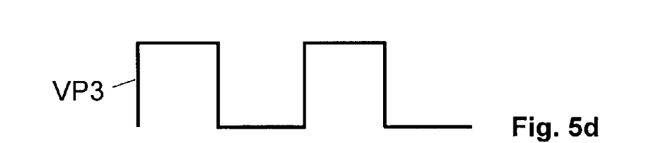
Figure 5E:
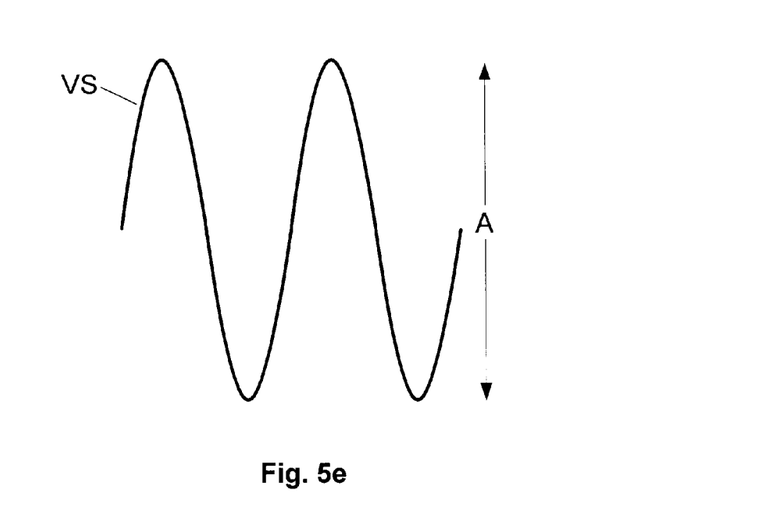

In response to the input signals on conductors 214 and 216, pulse generator 210 generates output pulses VP (FIGS. 5b–d) which vary in duty cycle depending on the comparison between input signals VR and VC. For example, as shown in FIG. 5a, if input VR is at level VR1, the resulting output pulses VP are shown by waveform VP1 (FIG. 5b). Waveform VP1 has a relatively narrow duty cycle and therefore a relatively low power. However, if voltage VR decreases to value VR2, then the output pulses VP increase in duty cycle and power as shown by wave form VP2 (FIG. 5c). Likewise, if input VR decreases to value VR3, the duty cycle and power of output pulses VP increase as shown by waveform VP3 (FIG. 5d).

Resonant circuit 230 receives output pulses VP after amplification by transistors 226 and 227. Resonant circuit 230 defines a resonant center frequency which lies within a band of effective resonant frequencies. The repetition rate of clock 202 lies within the band of effective resonant frequencies and preferably is identical to the center resonant frequency.

In response to the output pulses VP, resonant circuit 230 resonates pulses VP to generate a sinusoidal waveform VS having an amplitude A which varies in proportion to the duty cycle of the output pulses VP. Assuming signal VS is generated by waveform VP2, in response to waveform VP3, amplitude A increases, whereas in response to waveform VP1, amplitude A decreases.

In the preferred embodiment, the duty cycle of the output pulses VP is nominally at 25% and varies over a range from 0–50% as the level of signal VR varies.

As environmental conditions change, the DC level of signal VR changes by a corresponding amount and the duty cycle of signal VP likewise changes in order to vary the amplitude A of output sinusoidal waveform VS. As a result of this operation, if rotor 50 and stator 60 do not change in position, the currents induced in primary and secondary conductor arrangements 101 and 111 remain substantially constant even though environmental conditions change. Therefore, signal conditioning circuits 300 and 320 (FIG. 3) are able to generate output signals which accurately indicate changes in relative position between charge disk 52 and charge plug 140 in spite of changes in environmental conditions.

Signal conditioning circuit 300 implements a scale factor which is used to convert the amplitude of the AC current on conductor 301 to a voltage signal proportional to the angle between rotor 50 and stator 60 due to rotation around the x axis. In order to accomplish this goal, the signal on conductor 301 is rectified by diodes 302 and 303 and capacitor 308 filters the resulting rectified signal to produce a DC voltage on conductor 312 (FIG. 4).

The resulting scale factor relates the DC voltage on conductor 312 to the angle between stator 60 and rotor 50 due to rotation around the x axis. It is desirable to maintain a constant scale factor in order to maintain the resolution and accuracy of the capacitive position sensor in spite of environmental effects, such as changes in temperature, mechanical drift, radiation effects, and component degradation, which tend to interfere with the operation of the sensor. The scale factor is given by the following equation:

$$ScaleFactor = \left[\frac{2V_{in}}{\Pi}\right] C_{sf} \omega \left(\frac{C_s}{C_s + C_N}\right) R_f = \text{volts/radian.}$$

where
$V^{in}$=amplitude A of signal VS in Volts;
$\omega$=frequency of signal VS in radians/sec;
$C_{sf}$=capacitive scale factor which relates the angle between disk 52 and charge plug 140 along the X or Y axis to the change in sensor capacitance in Farads/radian (this is a function of sensor geometry);
$C_s$=capacitance from charge plug 140 to charge disk 52 in series with capacitance from charge disk 52 to primary conductor arrangement 101 in Farads.
$C_n$=capacitance from charge plug 140 to charge disk 52 in Farads, and
$R_f$=value of resistor 310 in Ohms.

As can be seen from the equation above, the scale factor is a linear function of many different variables including the frequency and amplitude of the excitation signal VS. Because the variables are linearly related, only one needs to be adjusted in order to keep the scale factor constant. For example, because the scale factor is directly proportional to the amplitude of the excitation signal VS, feedback circuit 250 may be used to change amplitude A of signal VS in order to account for environmental effects. By changing the amplitude of the excitation signal VS, environmental effects may be accounted for without changing the scale factor. In other words, a constant scale factor may be maintained regardless of environmental effects that may be present. In this way, the effect of environmental changes can be ameliorated without sacrificing sensor accuracy.

Signal conditioning circuit 320 is identical to circuit 300 and is responsive to the rectified output current to generate a signal in units of volts per radian which indicates the angle between rotor 50 and stator 60 due to rotation around the y axis.

While particular elements, embodiments and applications of the present invention have been shown and described, it is understood that the invention is not limited thereto since modifications may be made by those skilled in the art, particularly in light of the foregoing teaching. It is therefore contemplated that the appended claims will cover such modifications and incorporate those features which come within the spirit and scope of the invention.

What is claimed is:

1. In a position sensor for determining relative changes in position of a first member movable with respect to a second member, said sensor comprising at least a first conductor movable with one of said first and second members and a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, apparatus for generating said first signal comprising in combination:

a power supply furnishing a predetermined supply voltage to said sensor;

a pulse generator connected to generate output pulses at a predetermined repetition rate; and     a resonant circuit having a center resonant frequency included within a range of resonant frequencies which include said repetition rate, said resonant circuit being responsive to said output pulses to generate said first signal with a signal voltage greater than said supply voltage so that said current value is sufficiently large to facilitate processing.

2. Apparatus, as claimed in claim 1, wherein said repetition rate is substantially identical to said center resonant frequency.

3. Apparatus, as claimed in claim 1, wherein said resonant circuit comprises:

an inductor; and a capacitor at least partially inherent in said gap.

4. Apparatus, as claimed in claim 1, and further comprising a housing, at least said first conductor and said apparatus for generating being contained by said housing and being fixed with respect to said housing.

5. Apparatus, as claimed in claim 1, wherein said center resonant frequency is dependent upon said first capacitance.

6. In a position sensor for determining relative changes in position of a first member movable with respect to a second member, said sensor comprising at least a first conductor movable with one of said first and second members and a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, apparatus for generating said first signal comprising in combination:

a power supply furnishing a predetermined supply voltage to said sensor;

a pulse generator connected to generate output pulses at a predetermined repetition rate, said pulse generator altering a duty cycle of said output pulses in order to vary the amplitude of said first signal; and     a resonant circuit having a center resonant frequency included within a range of resonant frequencies which include said repetition rate, said resonant circuit being responsive to said output pulses to generate said first signal with a signal voltage greater than said supply voltage so that said current value is sufficiently large to facilitate processing.

7. A position sensor for determining relative changes in position of a first member movable with respect to a second member, comprising:

a first conductor movable with one of said first and second members;

a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, said first signal being coupled to said second conductor across said gap and then being coupled from said second conductor to said first conductor across said gap;

a power supply furnishing a predetermined supply voltage to said sensor;

a pulse generator r connected to generate output pulses at a predetermined repetition rate; and     a resonant circuit having a center resonant frequency included within a range of resonant frequencies which include said repetition rate, said resonant circuit being responsive to said output pulses to generate said first signal with a signal voltage greater than said supply voltage so that said current value is sufficiently large to facilitate processing.

8. Apparatus, as claimed in claim 7, wherein said first signal is coupled to a point at least adjacent said second conductor by a non-coaxial conductor.

9. In a position sensor for determining relative changes in position of a first member movable with respect to a second member, said sensor comprising at least a first conductor movable with one of said first and second members and a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, apparatus for generating said first signal comprising in combination:

a power supply furnishing a predetermined supply voltage to said sensor;

a pulse generator connected to generate output pulses at a predetermined repetition rate;

a resonant circuit having a center resonant frequency included within a range of resonant frequencies which include said repetition rate, said resonant circuit being responsive to said output pulses to generate said first signal with a signal voltage greater than said supply voltage so that said current value is sufficiently large to facilitate processing;

an output circuit responsive to said current value for generating an output signal indicating the relative position of said first and second members; and     a non-coaxial conductor for conducting said current to said output circuit.

10. In a position sensor for determining relative changes in position of a first member movable with respect to a second member, said sensor comprising at least a first conductor movable with one of said first and second members and a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, apparatus for generating said first signal comprising in combination:

means for furnishing a predetermined supply voltage to said sensor;

means for generating output pulses at a predetermined repetition rate; and resonant means having a center resonant frequency included within a range of resonant frequencies which include said repetition rate, said resonant means being responsive to said output pulses for generating said first signal with a signal voltage greater than said supply voltage so that said current value is sufficiently large to facilitate processing.

11. Apparatus, as claimed in claim 10, wherein said repetition rate is substantially identical to said center resonant frequency.

12. Apparatus, as claimed in claim 10, wherein said resonant means comprises:

an inductor; and a capacitor at least partially inherent in said gap.

13. Apparatus, as claimed in claim 10, and further comprising a housing, at least said first conductor and said apparatus for generating being contained by said housing and being fixed with respect to said housing.

14. Apparatus, as claimed in claim 10, wherein said center resonant frequency is dependent upon said first capacitance.

15. A position sensor for determining relative changes in position of a first member movable with respect to a second member, comprising:

a first conductor movable with one of said first and second members;

a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members;

means for furnishing a predetermined supply voltage to said sensor;

means for generating output pulses at a predetermined repetition rate, said means for generating output pulses altering a duty cycle of said output pulses in order to vary the amplitude of said first signal; and resonant means having a center resonant frequency included within a range of resonant frequencies which include said repetition rate, said resonant means being responsive to said output pulses for generating said first signal with a signal voltage greater than said supply voltage so that said current value is sufficiently large to facilitate processing.

16. A position sensor for determining relative changes in position of a first member movable with respect to a second member, comprising:

a first conductor movable with one of said first and second members;

a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members, said first signal being coupled to said second conductor across said gap and then being coupled from said second conductor to said first conductor across said gap;

means for furnishing a predetermined supply voltage to said sensor;

means for generating output pulses at a predetermined repetition rate, said means for generating output pulses altering a duty cycle of said output pulses in order to vary the amplitude of said first signal; and resonant means having a center resonant frequency included within a range of resonant frequencies which include said repetition rate, said resonant means being responsive to said output pulses for generating said first signal with a signal voltage greater than said supply voltage so that said current value is sufficiently large to facilitate processing.

17. Apparatus, as claimed in claim 16, wherein said first signal is coupled to a point at least adjacent said second conductor by a non-coaxial conductor.

18. A position sensor for determining relative changes in position of a first member movable with respect to a second member, comprising:

a first conductor movable with one of said first and second members;

a second conductor displaced from said first conductor by a gap defining a first capacitance, said second conductor being energized in response to an electrical first signal so that at least a portion of said first signal is coupled to said first conductor across said gap to induce a current in said first conductor having a current value which varies in response to relative changes in the position of said first and second members;

means for furnishing a predetermined supply voltage to said sensor;

means for generating output pulses at a predetermined repetition rate, said means for generating output pulses altering a duty cycle of said output pulses in order to vary the amplitude of said first signal;

resonant means having a center resonant frequency included within a range of resonant frequencies which include said repetition rate, said resonant means being responsive to said output pulses for generating said first signal with a signal voltage greater than said supply voltage so that said current value is sufficiently large to facilitate processing; and an output means responsive to said current value for generating an output signal indicating at least the relative position of said first and second members.

19. A method of generating an electrical first signal in a position sensor which determines relative changes in position of a first member movable with respect to a second member, said sensor comprising at least a first conductor movable with one of said first and second members and a second conductor displaced from said first conductor by a gap defining a first capacitance, said second conductor being energized in response to said first signal so that at least a portion of said first signal is coupled to said first conductor across said gap to induce a current in said first conductor having a current value which varies in response to relative changes in the position of said first and second members, comprising:

furnishing a predetermined supply voltage to said sensor;

generating output pulses at a predetermined repetition rate; and generating said first signal in response to said output pulses with a signal voltage greater than said supply voltage so that said current value is sufficiently large to facilitate processing.

20. A method of generating an electrical first signal in a position sensor which determines relative changes in position of a first member movable with respect to a second member, said sensor comprising at least a first conductor movable with one of said first and second members and a second conductor displaced from said first conductor by a gap defining a first capacitance, said second conductor being energized in response to said first signal so that at least a portion of said first signal is coupled to said first conductor across said gap to induce a current in said first conductor having a current value which varies in response to relative changes in the position of said first and second members, comprising:

furnishing a predetermined supply voltage to said sensor;

generating output pulses at a predetermined repetition rate; and generating said first signal in response to said output pulses with a signal voltage greater than said supply voltage at a resonant frequency substantially identical to said repetition rate so that said current value is sufficiently large to facilitate processing.

21. A method, as claimed in claim 20, including determining said resonant frequency utilizing said first capacitance.

22. A method, as claimed in claim 20, wherein generating output pulses comprises altering a duty cycle of said output pulses in order to vary the amplitude of said first signal.

23. A method, as claimed in claim 20, and further comprising generating an output signal indicating at least the relative position of said first and second members responsive to said current value.

24. The method of claim 19 wherein the generating comprises generating said first signal in response to said output pulses with a signal voltage greater than said supply voltage at a resonant frequency defined by a substantially fixed inductance and a capacitance defined at least in part by the gap.

* * * * *